United States Patent
Rowley et al.

[11] Patent Number: 6,082,780
[45] Date of Patent: Jul. 4, 2000

[54] EXTREME ANGLE JUNCTION OVERMOLDING

[75] Inventors: William W. Rowley, Chagrin Falls; Richard T. Seman, Newbury, both of Ohio

[73] Assignee: Mercury Plastics, Inc., Middlefield, Ohio

[21] Appl. No.: 09/018,781

[22] Filed: Feb. 4, 1998

[51] Int. Cl.[7] ................................... F16L 41/00
[52] U.S. Cl. .................. 285/132.1; 285/205; 285/285.1; 285/423; 264/271.1; 264/279
[58] Field of Search .................... 285/423, 205, 285/134.1, 133.11, 132.1, FOR 137, FOR 138, 285.1; 29/890.149, 890.148; 264/152, 154, 271.1, 279, 46.4

[56] References Cited

U.S. PATENT DOCUMENTS

| | | | |
|---|---|---|---|
| 850,023 | 4/1907 | Lewis | 285/132.1 X |
| 3,312,765 | 4/1967 | Scott | 264/152 |
| 3,760,842 | 9/1973 | Mikiya | 285/132.1 X |
| 3,989,787 | 11/1976 | Scott et al. | 264/114 |
| 4,020,644 | 5/1977 | True, Jr. et al. | 62/340 |
| 4,207,994 | 6/1980 | Offlee, Sr. | 222/146 |
| 4,312,687 | 1/1982 | Sigworth | 264/279 X |
| 4,367,769 | 1/1983 | Bain | 285/132.1 |
| 4,709,947 | 12/1987 | Kniess | 285/133.1 |
| 4,762,343 | 8/1988 | Hirohata | 285/179 X |
| 5,251,938 | 10/1993 | Erickeen | 285/179 X |
| 5,642,907 | 7/1997 | Dole | 285/148.23 |
| 5,655,750 | 8/1997 | Smock et al. | 251/148 |

FOREIGN PATENT DOCUMENTS 601801  8/1934  Germany ................. 285/FOR 137

*Primary Examiner*—Dave W. Arola
*Attorney, Agent, or Firm*—Buckingham, Doolittle & Burroughs, LLP

[57] ABSTRACT

The process of this invention will involve overmolding a thermoplastic or rubbery polymer composition over a thermoplastic hollow tube and a core insert to form a hollow overmolded coupler after the removal of the core insert, the tube entering the coupler at an angle which is less than 90° so as to minimize any freezing of transported water which may reside in the coupler. The combination of the above polymers must satisfy at least two simultaneous conditions. First, the inserted plastic tube must not soften and begin melt flow to the point where it looses structural integrity during the molding processing and second, the overmolded polymer must be capable of forming an essentially leak-proof interface between the coupler and the plastic tube, preferably through either a chemical and/or physical bond between the plastic tube and the overmolded plastic. In one aspect of the invention, the composition of the overmolded polymer will be such that it will be capable of at least some melt fusion with the composition of the plastic tube, thereby maximizing the leak-proof characteristics of the interface between the plastic tube and overmolded plastic, e.g., by having at least a component of the polymer composition of the plastic tube and that of the overmolded polymer being the same or at least sufficiently similar or compatible so as to permit the melt fusion or blending or alloying to occur at least in the interfacial region between the exterior of the plastic tube and the interior region of the overmolded polymer.

29 Claims, 1 Drawing Sheet

EXTREME ANGLE JUNCTION OVERMOLDING

TECHNICAL FIELD

This invention relates to an overmolding process to manufacture parts which contain overmolded connections, particularly in the field of connectors for use in refrigeration devices which incorporate automatic ice makers.

BACKGROUND OF THE INVENTION

In various applications, there is a need to simplify part constructions involving the joining of tubing with various types of couplers in a leak-proof manner, whether the tubing is of plastic or metallic composition, particularly in light of the shift from metallic couplers to plastic couplers. The prior art teaches the use of adhesives to join polymeric tubes to polymeric molded couplers. However, the use of adhesives is not desirable due to the possibility of closing and/or restricting the opening of the tube which is being connected. The prior art also teaches the use of various clamping arrangements for use with polymeric couplers and plastic tubing. However, joining tubes in this manner is time consuming involving the manual tightening of the clamp about the connection.

This problem is manifested in the connection of the water supply used in many refrigerators which incorporate automatic ice makers which are quickly becoming standard equipment on almost all refrigeration devices. An essential component of the ice maker is the connection from a house water line, which has typically been reduced to ¼" copper tubing, into the refrigeration device for use with the automatic ice maker. Prior art solutions have focused on the use of various complex shaped grommets which receive either the copper tube or a plastic tube which has been affixed to the copper tube via a union coupler, using a clamp arrangement. However, clamp arrangements are prone to leakage and are time consuming to install due to the manual labor required.

What is lacking in the prior art is any teaching which eliminates the clamping arrangement used in modem automatic ice makers regarding the water supply, a deficiency which is corrected by practicing the extreme angle overmolding invention described below. Depending on the precise conditions and polymeric materials used, overmolding can produce stronger, cleaner and more dependable connections than traditional adhesive or heat sealed joints.

SUMMARY OF THE INVENTION

This invention capitalizes on overmolding technology which permits the elimination of the use of either adhesives or clamps to effect the linking of the water supply into the refrigeration device for use with an automatic ice maker.

The process will involve overmolding a thermoplastic or rubbery polymer composition over a thermoplastic hollow tube and a core insert to form a hollow overmolded coupler after the removal of the core insert, the tube entering the coupler at an angle which is less than 90° so as to minimize any freezing of transported water which may reside in the coupler. The combination of the above polymers must satisfy at least two simultaneous conditions. First, the inserted plastic tube must not soften and begin melt flow to the point where it looses structural integrity during the molding processing and second, the overmolded polymer must be capable of forming an essentially leak-proof interface between the coupler and the plastic tube, preferably through either a chemical and/or physical bond between the plastic tube and the overmolded plastic. In one aspect of the invention, the composition of the overmolded polymer will be such that it will be capable of at least some melt fusion with the composition of the plastic tube, thereby maximizing the leak-proof characteristics of the interface between the plastic tube and overmolded plastic, e.g., by having at least a component of the polymer composition of the plastic tube and that of the overmolded polymer being the same or at least sufficiently similar or compatible so as to permit the melt fusion or blending or alloying to occur at least in the interfacial region between the exterior of the plastic tube and the interior region of the overmolded polymer. Another manner in which to state this would be to indicate that at least a portion of the polymer compositions of the arm and the overmolded polymer are miscible.

It is an object of this invention to use overmolding technology to join plastic tubing with a plastic coupler without the need for the use of adhesives or clamps, thereby facilitating the installation of the water supply into the refrigeration device.

It is another object of this invention to teach a process by which it is possible to remove a core insert from a molded part that is mechanically locked to the core(s).

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DESCRIPTION OF THE PREFERRED EMBODIMENTS

This invention will now be described in detail with referenced to preferred embodiments thereof. Throughout the specification, including the claims, compositions are given in percent by weight unless the contrary is expressly stated.

Figure 5:
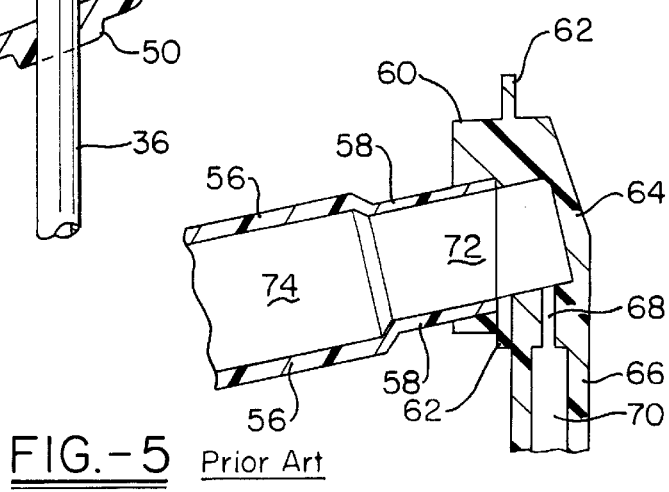
FIG. 5 is a cross-sectional view of a Prior Art connector which would utilize either a clamp or an adhesive to effect the leak-proof engagement with the inserted tube.

The prior art of FIG. 5 is illustrative of the type of molded coupler which is in prevalent usage today. In this coupler, a cylindrical tube 56 will define a central cavity 74, into which a second plastic part (not shown) is inserted for ultimate passage into the ice maker positioned within the refrigerator. An upper chamber 72 of the central cavity 74 may be of smaller diameter than that of the central cavity and is defined by cylindrical walls 58 and end cap 64. A triangular or square-shaped grommet 60 with peripheral flange 62 surrounds the head of the coupler, the grommet facilitating retention of the coupler in the generally circular opening (although it is recognized that many different shapes could be accomodated) within the refrigerator back side. The upper chamber 72 of the central cavity 74 is in communication with female receiving end of the coupler via feed pathway 68, the female receiving end of the coupler being defined by cylindrical walls 66 which define receiving cavity 70. A water supply feed (not shown) is inserted into receiving cavity 70 and secured in a leak-proof manner to the coupler either by the application of an adhesive to the outside of the penetrating end of the water line, or by the use of a clamp which is secured about the exterior of cylindrical walls 66 and which physically compresses the cylindrical walls 66 thereby achieving the leak-proof engagement with the inserted water line. As mentioned previously, the application of a clamping arrangement is unsatisfactory due to the manual labor involved and the application of an adhesive is also unsatisfactory due to the curing time inherent in any adhesive operation as well as the potential for either further restricting or closing the feed pathway 68.

Figure 2:
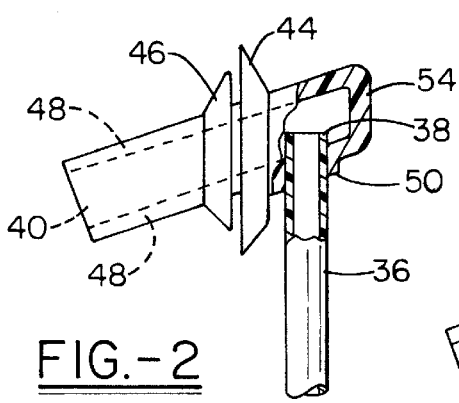
FIG. 2 shows an elevational view of an overmolded connector made using the mold of FIG. 1.
Figure 3:
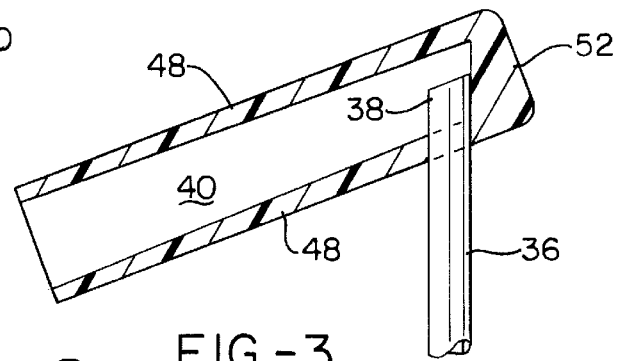
FIG. 3 shows an elevational view in partial cross-section, showing the overmolded connection without any outer grommet, and having a top configuration of the connector which is in close physical proximity to at least a portion of the inserted tube.
Figure 4:
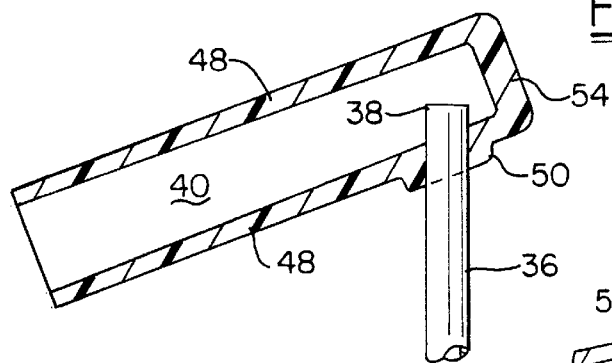
FIG. 4 shows a view similar to FIG. 3 whereby the top configuration of the connector which is physically separated from the inserted tube.

These problems are eliminated by moving toward an overmolded coupler such as is shown in FIGS. 2–4. With specific reference to FIG. 2, an overmolded coupler is shown having a cylindrical walls 48 which define a central cavity 40, into which at least partially protrudes a tip 38 of a plastic tube 36. The coupler is shown having a grommet arrangement 44,46 which facilitates the retention of the coupler in the generally circular opening within the back side of the refrigerator. Another embodiment of the overmolded connector is shown in FIG. 3 wherein the central cavity 40 is once again defined by cylindrical walls 48, and for which into which protrudes a tip 38 of a plastic tube 36. However, in this arrangement, the protruding tip is shown in close physical proximity to a cylinder end 52, unlike the arrangement shown in FIG. 4 wherein there is a gap present between the protruding tip 38 of the plastic tube 36 and the cylinder end 54. As seen in FIGS. 2–4, in order that the water which flows from the plastic tube 36 into the central cavity 40, does not freeze in the central cavity, thereby potentially causing an ice dam within the cavity, an angle between the longitudinal axis of the cylindrical walls of the central cavity and the longitudinal axis of the plastic tube is always less than 90°. More preferably, this angle between the two longitudinal axes is between 10 and 85°, and more preferably between 20 and 80°. In a most preferred embodiment, this angle is between 60 and 75°.

Figure 1:
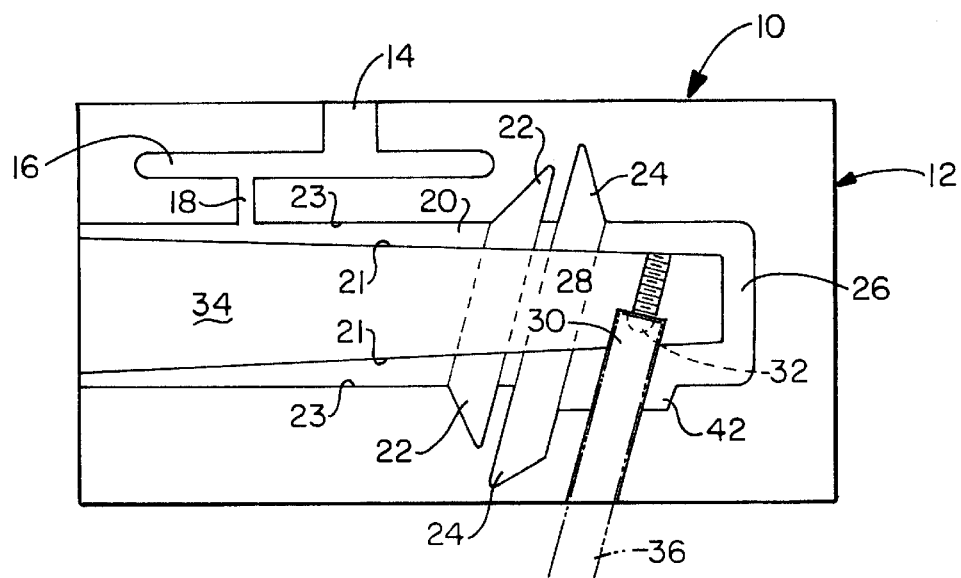
FIG. 1 shows one-half of a mold which would be used in the overmolding operation, showing a plastic tube in ghost lines as it would be inserted prior to the overmolding processing.

The mold 10 (FIG. 1) used in the overmolding process by which the overmolded coupler shown in FIGS. 2–4 is made include the insertion of a plastic tube 36 at least onto and preferably into a recess 30 contained within a core insert 34, said tube also being positioned within a channel cavity which communicates to the exterior of the mold. Optionally, said core insert will have a male projection 32 at a base of the recess 30 which will aid in the positioning of the hollow plastic tube 36 into the recess. In one embodiment, this male projection is formed by the insertion of a screw or threaded dowel pin 28 from an opposed wall of the core insert, although many other manufacturing steps could be used for the formation of this projection, if used at all. The mold 12 for which only one half is shown, will include a polymer feed stream 14, a reservoir 16 and a runner 18 which feeds the overmolded molten polymer into a cavity 20 defined between the exterior walls of the core insert 21 and the interior walls of the mold cavity 23. These interior mold cavity walls may additionally have various indentations 22,24 suitable for the formation of the opposed flanges 44,46 shown in FIG. 2. The mold cavity wall may optionally have a recess 42 for forming an extra pimple or elevated ridge of sealing material 50 about an exterior of the plastic tube 36.

It is also possible that the grommet flanges 44,46 and the overmolded pimple or elevated ridge of sealing material 50 need not be formed simultaneously with the coupler, but rather in a separate subsequent step utilizing overmolding processing. It is recognized that the dimensions of the mold cavity 20 will control the thickness of the overmolded coupler, are variable depending on several factors, which would include the degree of flexibility of the work piece, the intended application of the work piece, overmold material flow rate, etc., among others. In a preferred embodiment of the invention, the core insert will be frustoconical in shape to facilitate in the removal of the overmolded coupler.

Injection molding of thermoplastics is a process by which plastic is melted and injected into a mold cavity void, defined in this instance as the void volume between the mold core body and the mold cavity. Once the melted plastic is in the mold, it cools to a shape that reflects the form of the cavity. The resulting part is a finished part needing no other work before assembly into or use as a finished part. The injection molding machine has two basic components: an injection unit to melt and transfer the plastic into the mold, and a clamp to hold the mold shut against injection pressures and for parts removal. The injection unit melts the plastic before it is injected into the mold, then injects the melt with controlled pressure and rate into the mold. After the injection cycle, the clamp gently opens the mold halves.

Important factors in the processing of plastic include temperature, consistency, color dispersion and density of the melt. Conductive heat supplied by barrel temperature and mechanical heat generated by screw rotation both contribute to the processing of good quality melt. Often, most of the energy available for melting the plastic is supplied by screw rotation. Mixing happens between screw flights and the screw rotates, smearing the melted surface from the plastic pellet. This mixing/shearing action is repeated as the material moves along the screw until the plastic is completely melted.

If the polymer is a thermoset, injection molding uses a screw or a plunger to feed the polymer through a heated barrel to decrease its viscosity, followed by injection into a heated mold. Once the material fills the mold, it is held under pressure while chemical crosslinking occurs to make the polymer hard. The cured part is then ejected from the mold while at the elevated temperature and cannot be reformed or remelted.

When thermoplastics are heated in an injection press, they soften and as pressure is applied, flow from the nozzle of the press into an injection mold. The mold has cavities that, when filled with the thermoplastic or thermoformable material, define the molded part. The material enters these cavities through passages cut into the mold, called runners. The mold also has passages in it to circulate a coolant, usually water, through strategic areas to chill the hot plastic. As it cools, the thermoplastic material hardens. When cooled enough, the mold opens and the part is removed.

This means that during the overmolding process, the polymeric material used must be sufficiently formable, by melting, such that it may be forced to flow into and around the other preformed elements (i.e., core insert and polymeric arm). During this thermomelting process, heat and pressure are often applied.

Discussion

Unlike metallic connections, which are typically bulky and expensive, and unlike adhesive systems which requires a match of the polymers to be joined with the adhesive used, the overmolding process of this invention permits a joining of various pieces of tubing with a dissimilar polymer, thereby permitting the combination of fairly rigid tubes to be joined in an essentially leak-proof manner.

While the precise composition of the plastic components of this invention and overmolded polymer are not required to be of any specified polymer, in general, there are several guidelines which are applicable in the practice of this invention. It is of course, recognized that the precise operating conditions utilized in the overmolding process are well-known in the art and are specific to each injection molded polymer. It is well within the skill of the art to determine the applicable conditions which will result in the appropriate overmolded polymer.

In the practice of this invention, illustrative and non-limiting examples of the polymers which may be used in various combinations to form the plastic tube as well as polymers which may be used in the overmolding process would include: polyacetals, typically highly crystalline linear thermoplastic polymers of oxymethylene units; poly (meth)acrylics, typically belonging to two families of esters, acrylates and methacrylates; polyarylether ketones containing ether and ketone groups combined with phenyl rings in different sequences and polyether ketones; polyacrylonitrile resins wherein the principal monomer is acrylonitrile; nylons or polyamides, including various types of nylon-6, nylon-6/6, nylon-6/9, nylon-6/10, nylon-6/12, nylon-11, nylon-12; polyamide-imides formed by the condensation of trimellitic anhydride and various aromatic diamines; polyacrylates of aromatic polyesters derived from aromatic dicarboxylic acids and diphenols; polybutene resins based on poly(1-butene); polycarbonates, typically based on bisphenol A reacted with carbonyl chloride; polyalkylene terephthalates typically formed in a transesterification reaction between a diol and dimethyl terephthalate; polyetherimides, based on repeating aromatic imide and ether units; polyethylene homopolymers and copolymers, including all molecular weight and density ranges and degrees of crosslinking; polypropylene homopolymers and copolymers; ethylene acid copolymers from the copolymerization of ethylene with acrylic or methacrylic acid or their corresponding acrylate resins; ethylene-vinyl acetate copolymers from the copolymerization of ethylene and vinyl acetate; ethylene-vinyl alcohol copolymers; polyimides derived from aromatic diamines and aromatic dianhydrides; polyphenylene oxides including polystyrene miscible blends; polyphenylene sulfides; acrylonitrile butadiene styrene terpolymers; polystyrenes; styrene-acrylonitrile copolymers; styrene-butadiene copolymers thermoplastic block copolymers; styrene maleic anhydride copolymers; polyarylsulfones; polyethersulfones; polysulfones; thermoplastic elastomers covering a hardness range of from 30 Shore A to 75 Shore D, including styrenic block copolymers, polyolefin blends (TPOS), elastomeric alloys, thermoplastic polyurethanes (TPUS), thermoplastic copolyesters, and thermoplastic polyamides; polyvinyl chlorides and chlorinated polyvinyl chlorides; polyvinylidene chlorides; allyl thermosets of allyl esters based on monobasic and dibasic acids; bismaleimides based generally on the condensation reaction of a diamine with maleic anhydride; epoxy resins containing the epoxy or oxirane group, including those epoxy resins based on bisphenol A and epichlorohydrin as well as those based on the epoxidation of multifunctional structures derived from phenols and formaldehyde or aromatic amines and aminophenols; phenolic resins; unsaturated thermoset polyesters including those of the condensation product of an unsaturated dibasic acid (typically maleic anhydride) and a glycol, wherein the degree of unsaturation is varied by including a saturated dibasic acid; thermoset polyimides; polyurethanes containing a plurality of carbamate linkages; and urea and melamine formaldehyde resins (typically formed by the controlled reaction of formaldehyde with various compounds that contain the amino group).

The combination of the above polymers must satisfy at least two simultaneous conditions. First, the inserted plastic tube must not soften and begin melt flow to the point where it loses structural integrity and second, the overmolded polymer must be capable of forming an essentially leak-proof interface between the coupler and the plastic tube, preferably through either a chemical and/or physical bond between the plastic tube and the overmolded plastic.

While using polymer compositions which have differing softening points is one way to achieve the above objective, there are alternatives, which would include the use of two compositions which have the same softening point, but which are of different thicknesses, thereby through manipulation of the time, temperature and pressure conditions experienced during the molding operation the plastic tube would not experience melt flow, even the plastic tube had a similar softening point or range to that of the overmolded plastic. It is also possible that through the incorporation of various additives in the polymeric compositions, e.g., glass fibers, heat stabilizers, anti-oxidants, plasticizers, etc., that the softening temperatures of the polymers may be controlled.

In a preferred embodiment of the invention, the composition of the overmolded polymer will be such that it will be capable of at least some melt fusion with the composition of the plastic tube, thereby maximizing the leak-proof characteristics of the interface between the plastic tube and overmolded plastic. There are several means by which this may be effected. One of the simplest procedures is to insure that at least a component of the polymer composition of the plastic tube and that of the overmolded polymer is the same. Alternatively, it would be possible to insure that at least a portion of the polymer composition of the plastic tube and that of the overmolded polymer is sufficiently similar or compatible so as to permit the melt fusion or blending or alloying to occur at least in the interfacial region between the exterior of the plastic tube and the interior region of the overmolded polymer. Another manner in which to state this would be to indicate that at least a portion of the polymer compositions of the arms and the overmolded polymer are miscible.

In yet another embodiment, composites of rubber/thermoplastic blends are useful in adhering to thermoplastic materials used in the polymeric arms. These blends are typically in the form of a thermoplastic matrix containing rubber nodules functionalized and vulcanized during the mixing with the thermoplastic. The composite article is then obtained by overmolding the vulcanized rubber/thermoplastic blend onto the thermoplastic arm. In this manner, the cohesion at the interface between these two materials is generally higher than the tensile strength of each of the two materials. The quantity of vulcanizable elastomer may be from 20 to 90% by weight of the vulcanizable elastomer block copolymer combination. This block copolymer comprises a polyether or amorphous polyester block as the flexible elastomeric block of the thermoplastic elastomer while polyamide, polyester or polyurethane semicrystalline blocks for the rigid elastomeric block of the thermoplastic elastomer. In this approach, it is postulated, without being held to any one theory of operation or mechanism, that the leak-proof aspect of this coupler utilizes a phenomenon typically used in the formation of moisture-proof electrical connections, i.e., dynamic vulcanization shrink wrap. In this manner, the overmolded polymer is formed having a internally latent stresses which upon the application of heat, permit the relaxation of the stresses with resulting contraction of various polymeric strands within the composition during cooling.

In one specific embodiment of this invention which meets the above criteria, the plastic tube is polypropylene and the overmolded polymer is SANTOPRENE® thermoplastic elastomer by Advanced Elastomer Systems. The coupler is formed by inserting the plastic tube into the core insert and placing this assembly into a mold which has been heated to approximately 440° F., followed by overmolding the SANTOPRENE® over the assembly as defined by the mold cavity. In this manner, due to the fact that the SANTOPRENE® polymer is an ethylene-propylene copolymer, the melt fusion of at least a portion of the polypropylene arms with at least the propylene portion of the SANTOPRENE® will be effected. There is minimal chemical and/or physical bonding with the SANTOPRENE® and that of the polyester core insert, although with a different core insert composition, the ability to form such bonds will only enhance the leak-proof aspect of the coupler.

This invention has been described in detail with reference to specific embodiments thereof, including the respective best modes for carrying out each embodiment. It shall be understood that these illustrations are by way of example and not by way of limitation.

What is claimed is:

1. A coupler comprising:
   a tube having first and second ends, an internal conduit and a longitudinal axis; and
   a polymeric cylinder overmolded around the tube, the cylinder having a first and a second end and a longitudinal wall therebetween through which the tube passes, an essentially central cavity surrounded by the wall, and a longitudinal axis;
   such that the first end of the tube extends into the central cavity.

2. The coupler of claim 1 wherein the tube is a thermoplastic and the polymeric cylinder is selected from the group consisting of thermoplastic elastomers and rubbers.

3. The coupler of claim 2 wherein
   the plastic tube is selected from the group consisting of polyacetals, poly(meth)acrylics, polyarylether ketones, polyether ketones, polyacrylonitrile resins, polyamides, polyamide-imides, polyacrylates, polybutene resins, polycarbonates, polyalkylene terephthalates, polyetherimides, polyethylene homopolymers, polyethylene copolymers, polypropylene homopolymers, polypropylene copolymers, ethylene acid copolymers, ethylene-vinyl acetate copolymers, ethylene-vinyl alcohol copolymers, polyimides, polyphenylene oxides, polyphenylene sulfides, acrylonitrile butadiene styrene terpolymers, polystyrenes, styrene-acrylonitrile copolymers, styrene-butadiene copolymers, styrene maleic anhydride copolymers, polyarylsulfones; polyethersulfones; polysulfones, thermoplastic styrenic block copolymers, thermoplastic polyolefin blends, thermoplastic elastomeric alloys, thermoplastic polyurethanes, thermoplastic copolyesters, thermoplastic polyamides, polyvinyl chlorides, chlorinated polyvinyl chlorides, polyvinylidene chlorides, allyl thermosets of allyl esters, bismaleimides, epoxy resins, phenolic resins, unsaturated thermoset polyesters, thermoset polyimides, polyurethanes, urea and melamine formaldehyde resins.

4. The coupler of claim 1 wherein the tube has a higher melt temperature than the polymeric cylinder.

5. The coupler of claim 1 wherein the tube is in leak-proof engagement with the polymeric cylinder by having at least a portion thereof melt fused to at least a portion of the polymeric cylinder where the tube passes through the wall of the polymeric cylinder.

6. The coupler of claim 1 wherein the tube is polypropylene; and the polymeric cylinder is a thermoplastic.

7. The coupler of claim 2 wherein the tube is polypropylene; and the polymeric cylinder is an ethylene-propylene copolymer.

8. The coupler of claim 1 which further comprises:
   at least one flange on an exterior surface of the polymeric cylinder.

9. The coupler of claim 8 which further comprises:
   at least two flanges on said exterior surface of the polymeric cylinder.

10. The coupler of claim 1 wherein the longitudinal axes of the tube and the polymeric cylinder intersect at an angle of less than 90°.

11. The coupler of claim 10 wherein the angle is between 10 and 85° inclusive.

12. The coupler of claim 11 wherein
    the angle is between 20 and 80° inclusive.

13. The coupler of claim 12 wherein
    the angle is between 60 and 75° inclusive.

14. The coupler of claim 1, further comprising an elevated ridge of the material comprising the polymeric cylinder around the exterior of the tube where the tube passes through the wall of the polymeric cylinder.

15. The coupler of claim 1 wherein the first end of the polymeric cylinder is closed, the second end of the polymeric cylinder is open and the tube passes through the wall near the closed first end.

16. The coupler of claim 15 wherein an internal diameter of said polymeric cylinder is larger at the open end than at the closed end.

17. The coupler of claim 16 wherein said internal diameter decreases linearly from said open end to said closed end.

18. A process for forming a coupler which comprises:
    inserting a thermoplastic plastic tube having a longitudinal axis onto a core insert; and
    overmolding a polymeric composition over any exposed portions of the plastic tube in a cavity of a mold to form a polymeric cylinder having a longitudinal axis, wherein the polymeric composition is selected from the group consisting of thermoplastic elastomers and rubbers at a temperature and for a time necessary to effect the overmolding of the polymeric composition, such that the angle formed between the respective longitudinal axes is less than 90°.

19. The process of claim 18 wherein
    a composition of the thermoplastic plastic tube is selected independently from the group consisting of polyacetals, poly(meth)acrylics, polyarylether ketones, polyether ketones, polyacrylonitrile resins, polyamides, polyamide-imides, polyacrylates, polybutene resins, polycarbonates, polyalkylene terephthalates, polyetherimides, polyethylene homopolymers, polyethylene copolymers, polypropylene homopolymers, polypropylene copolymers, ethylene acid copolymers, ethylene-vinyl acetate copolymers, ethylene-vinyl alcohol copolymers, polyimides, polyphenylene oxides, polyphenylene sulfides, acrylonitrile butadiene styrene terpolymers, polystyrenes, styrene-acrylonitrile copolymers, styrene-butadiene copolymers, styrene maleic anhydride copolymers, polyarylsulfones; polyethersulfones; polysulfones, thermoplastic styrenic block copolymers, thermoplastic polyolefin blends, thermoplastic elastomeric alloys, thermoplastic polyurethanes, thermoplastic copolyesters, thermoplastic polyamides, polyvinyl chlorides, chlorinated polyvinyl chlorides, polyvinylidene chlorides, allyl thermosets of allyl esters, bismaleimides, epoxy resins, phenolic resins, unsaturated thermoset polyesters, thermoset polyimides, polyurethanes, urea and melamine formaldehyde resins.

20. The process of claim 18 wherein a composition of the thermoplastic of the plastic tube has a higher melt temperature than a composition of the polymeric composition selected from the group consisting of thermoplastic elastomers and rubbers.

21. The process of claim 18 wherein the plastic tube is in leak-proof engagement with the overmolded polymeric composition by having at least a portion of the plastic tube which is melt fusible with at least a portion of the overmolded polymeric composition at an interface of the plastic tube and overmolded polymeric composition.

22. The process of claim 18 wherein the plastic tube is polypropylene; and the overmolded polymeric composition is an ethylene-propylene copolymer.

23. The process of claim 18 wherein an exterior diameter of said core insert is larger at an end of the cylinder opposed from an end into which is inserted the plastic tube.

24. The process of claim 23 wherein said core insert is frustoconical in shape.

25. The process of claim 18 wherein said step of inserting further comprises inserting said plastic tube into a recess in said core insert.

26. The process of claim 25 wherein said step of inserting further comprises inserting said plastic tube into a recess in said core insert, said recess further having a projection having an external diameter which is smaller than an interior diameter of said plastic tube.

27. The process of claim 18 wherein the angle is between 10 and 85° inclusive.

28. The process of claim 27 wherein the angle is between 20 and 80° inclusive.

29. The process of claim 28 wherein the angle is between 60 and 75° inclusive.

* * * * *